United States Patent
Methlouthi

(10) Patent No.: US 6,443,362 B1
(45) Date of Patent: Sep. 3, 2002

(54) INTEGRATED CIRCUIT CARD WITH A BONUS COUNTER AND A METHOD COUNTING BONUSES

(75) Inventor: Mounji Methlouthi, Puyloubier (FR)

(73) Assignee: Gemplus (FR)

(*) Notice: Subject to any disclaimer, the term of this patent is extended or adjusted under 35 U.S.C. 154(b) by 0 days.

(21) Appl. No.: 09/414,324

(22) Filed: Oct. 6, 1999

(30) Foreign Application Priority Data

Apr. 3, 1997 (FR) .............................. 97 04091
Apr. 3, 1998 (WO) ........................ WO9844463

(51) Int. Cl.$^7$ .................... G06K 19/00; G06K 19/06
(52) U.S. Cl. ............................. 235/487; 235/492
(58) Field of Search ............................ 235/487, 492; 705/14

(56) References Cited

U.S. PATENT DOCUMENTS

| | | | | |
|---|---|---|---|---|
| 4,700,055 A | * | 10/1987 | Kashkashian, Jr. | 235/379 |
| 5,200,889 A | * | 4/1993 | Mori | 364/401 |
| 5,310,997 A | * | 5/1994 | Roach et al. | 235/375 |
| 5,380,991 A | | 1/1995 | Valencia et al. | |
| 5,806,045 A | * | 9/1998 | Biorge et al. | 705/14 |
| 5,901,303 A | * | 5/1999 | Chew | 395/400 |

FOREIGN PATENT DOCUMENTS

| | | |
|---|---|---|
| EP | 0311495 | 4/1989 |
| EP | 0640945 | 3/1995 |
| EP | 0736849 | 10/1996 |
| EP | 0740268 | 10/1996 |
| EP | 0775990 | 5/1997 |
| EP | 0786746 | 7/1997 |
| FR | 2762424 A1 * | 4/1997 |
| WO | WO95/21428 | 8/1995 |

\* cited by examiner

*Primary Examiner*—Karl D. Frech
*Assistant Examiner*—April Nowlin
(74) *Attorney, Agent, or Firm*—Burns, Doane, Swecker & Mathis, L.L.P.

(57) ABSTRACT

In order to facilitate the taking into account of bonus points, it is recommended that the reader which effects a transaction with an integrated circuit card (1) sends an identity (Ii) to this card. This identity enables the card to recognise (12) with which type of service provider or vendor it is dealing, and to implement a set of rules (5, 11) specific to this service provider or vendor or, failing that, standard rules of the card issuer. These rules calculate bonuses specific to this supplier. These bonuses are totalled in a counter (10, 13) also specific to this supplier.

13 Claims, 1 Drawing Sheet

INTEGRATED CIRCUIT CARD WITH A BONUS COUNTER AND A METHOD COUNTING BONUSES

This application is based on French patent application No. 97/04091, filed on Apr. 3, 1997, which is incorporated by reference herein.

BACKGROUND

The object of the present invention is an integrated circuit card provided with bonus counters storing bonus points granted to the holder of the card during transactions which he makes using this card. The invention can be used particularly in the field of multiple or universal applications. This can notably be the case with a bank payment card with which it is possible to make various purchases from various suppliers.

The applications of this type, making it possible to manage bonus counters, related for example to loyalty programs, are currently located either in central sites of the operators, or in terminals capable of interfacing with the integrated circuit cards. In certain cases, the integrated circuit cards themselves have bonus counters. However, in this case, these counters are dedicated to a single use. For example, through European patent application EP-A-0 311 495, a bonus counter is known which makes it possible to allocate, to the holder of the card, bonuses proportional to the period during which prepaid units have not been used. In a sense, it is a case of a service providing interest on the units not yet used. This type of bonus recorded in the card is of course adapted only to remuneration, and loyalty creation, with regard to the service which can be acquired with this card, here a banking service.

When the loyalty creation counters are situated in central sites, or in terminals or readers capable of interfacing with the card, the following problems are encountered.

Where the applications are located in central sites, the bonus units, points, are determined only in deferred time, and not immediately at the point of sale. This is because each reading terminal is connected to the central site only during the evening. At the time of connection, it indicates, for a given customer account, the number of points allocated to it.

In the case of applications located in the terminals, a first problem arises of complexity of implementation of the loyalty creation options in all the terminals in a group. In this case in addition, so that the cohabitation of the loyalty creation application with the payment application is made secure, it is necessary to put, in the readers, a protection circuit known as a SAM (secure application module). In particular, security is necessary to guarantee the totalling of the points in the card. The SAM circuits must themselves be changed regularly, which makes these readers expensive and difficult to manage.

SUMMARY

The object of the invention is to remedy these drawbacks by recommending a calculation of the points by the integrated circuit card itself. In this case, in the invention, provision is made for causing an indication to be sent by the terminal which enables the integrated circuit card to identify the service provider or vendor. From this identification, the integrated circuit card can seek in its executable program rules specific to the service provider or vendor identified. It can then calculate, in order to store them in a specific counter, points relating to this specific supplier. The result of the calculation can be stored in the reader or, preferably, in the card.

The object of the invention is therefore an integrated circuit card having, in the integrated circuit of the card, a microprocessor for executing a program of an application with a first set of rules, and a bonus counter for accounting for bonuses resulting from the application of these rules, characterised in that the integrated circuit of the card has a memory for storing the program of the application, in that the program of the application has at least a second set of rules and a test, the test serving to detect, in a message sent by a reader to the integrated circuit card, an item of information relating to one of the sets of rules, the test then serving to initiate the rules of the set detected, the integrated circuit also having as many different bonus counters as there are different sets of rules.

Another object of the invention is a method of counting bonus points in an integrated circuit card having, in the integrated circuit of the card, a microprocessor for executing a program of an application, characterised in that several sets of bonus calculation rules are stored in the card, a reader in connection with the card sends a message to the card giving information on its identity, with the message sent by the reader the match between this identity received and a set of rules is detected, the rules of the detected set are initiated, and a count of bonuses corresponding to these rules is calculated.

BRIEF DESCRIPTION OF THE FIGURES

The invention will be better understood from a reading of the description which follows the examination of the figures which accompany it. These are given only for indication and are in no way limitative of the invention. The figures show.

DETAILED DISCRETION

Figure 1:
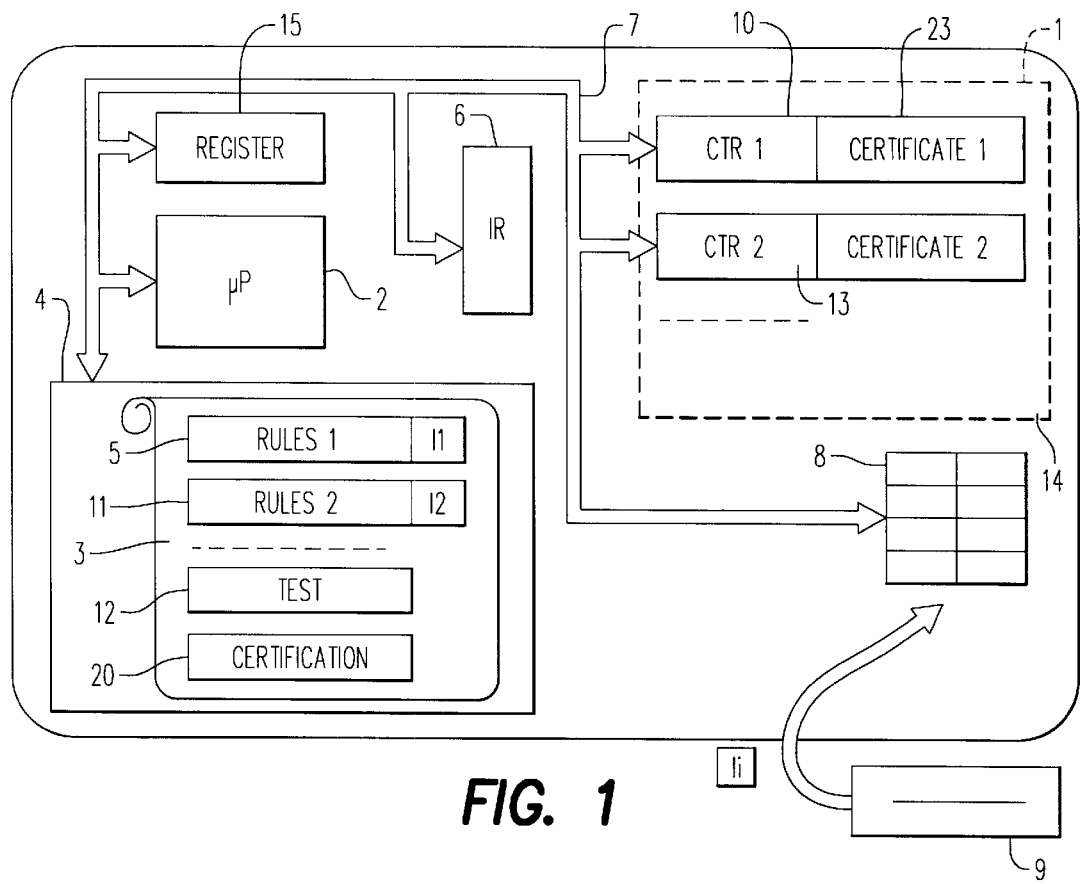
FIG. 1: a schematic representation of an integrated circuit card provided with the device of the invention.

FIG. 1 shows an integrated circuit card 1. The integrated circuit has a microprocessor 2 able to execute an application program. The application program is for example a program 3, contained in the memory 4. The program 3 contains a first set 5 of rules. These rules are executed by loading the appropriate instructions into an instruction register 6 of the microprocessor 2 by means of a control, address and data bus 7. The rules can use data internal to the card (the value of the internal bonus counters, etc) and data communicated by the reader during the initial transaction (eg amount, date of the transaction, time, etc).

The integrated circuit of the card 1 is also connected by an interface 8, here represented symbolically by an electrical connector, with a reader 9. The interface 8 is also connected to the bus 7. The interface 8 can have connection means other than electrical: radio links, links by infrared, or others. The instruction which the microprocessor 2 executes can come from the reader 9 and have been loaded into the instruction register 6 by means of the interface 8 and bus 7.

In a dedicated application contained in a card, supplied by a single service supplier, there exists a counter 10 for counting bonus points specific to this application, to the rules contained in the set 5.

One of the characteristics of the invention is that the memory 4 contains, in the program 3, the set 5 of rules which will make it possible to count bonuses, and at least a second set 11 of rules, making it possible to count bonuses in a different manner. Another characteristic of the invention is the presence, in the integrated circuit, of test means 12, for recognising in a message sent by the reader 9 to the card 1 an identity Ii relating to a set of rules. The test means are preferably software means, but they could be replaced by a circuit, of the decoder type for example, which, by decoding the identity received would point an instruction pointer to the start of the set of rules corresponding to the decoded identity.

Receiving the identity Ii, in the software version, the microprocessor 2 first of all tests to find out whether there exists, in the program 3 of the memory 4, a set of rules matching this identity. Once the set of rules is found, the test subprogram 12 loads these rules into the instruction register 6 of the microprocessor 2 and causes it to execute them. The execution of these rules then results, in the invention, in incrementing a counter 13 specific to the rules detected. This incrementation can include the prior calculation of the increment according, where applicable, to the amount of the transaction made by the carrier.

In one example, the counters 10 or 13 are of the abacus type and/or recorded in non-volatile memory 14 of the EEPROM type in the integrated circuit. In addition, the integrated circuit of the card has a register 15 in volatile memory, in which the bonus account can be temporarily recorded if a counter 10 or 13 is not present. This register 15 serves to effect the exchanges with the reader 9.

Figure 2:
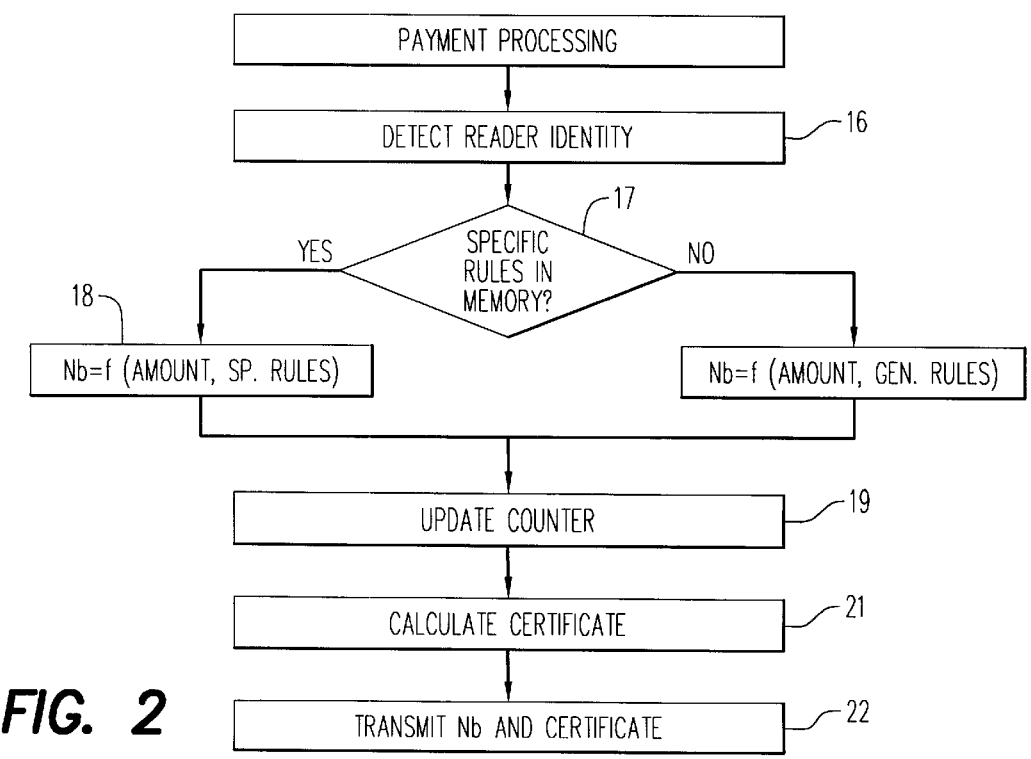
FIG. 2: the main steps of the method of the invention.

The method of the invention is depicted in FIG. 2. The first step is to store, in the memory 4 of the card, several sets 5, 11 of bonus calculation rules, each set corresponding to a reader or service provider identity.

During the processing of a payment corresponding to a transaction with an integrated circuit card shown in FIG. 1, the reader 9 is connected with the card 1, and sends its identity Ii to the card 1. In the card 1, an occurrence Ii=I1 or Ii=I2, . . . is detected in the memory 3, and a match between the identity sent and a set of rules stored at the same address in the memory 4. When these rules are found, they are caused to be executed by the microprocessor 2 so as to obtain the calculation of the bonuses Nb which correspond to them. If there are no bonus calculation rules in the card, it can be chosen to cause the reader to calculate bonuses by the conventional method: with standard rules of the card issuer.

As an alternative, the identity of the reader can be communicated to the card immediately after the payment transaction and the triggering of the bonus calculation is concatenated automatically as soon as the payment processing has ended.

FIG. 2 shows steps 16 to 18, which correspond to these three operations. Subsequently, of course, there is an updating 19 of the bonus counter. This bonus counter, according to the method of the invention, can be stored in the memory 14 or in the reader 9. If it is stored in the reader 9, it will suffer the drawback of not being able to be directed to the central service except in deferred mode. However, the method of the invention has the effect of eliminating or greatly simplifying the bonus management program of the reader 9. It also has the effect of eliminating the need to implement a protection circuit in the reader 9 since the protected calculation will be effected in the card.

In this case, preferably, the program 3 includes a certification subprogram 20 for calculating, in an operation 21, a certificate relating to the number of points counted. The calculation of the certificate is effected in a known manner in the card by implementing, with the microprocessor 2, a certification algorithm stored in the program 3. Then, in an operation 22, the microprocessor 2 can cause the sending, to the reader 9, of the number of points counted and the certificate attached to this count.

The number of points can be elementary and correspond solely to the purchase made previously and the particular rules implemented. This count can also correspond to a previous total increased by the new number of points counted. In this case, the card will preferably include the counters 10 and 13 in the non-volatile memory 14. Optionally, the certificate calculated during the operation 21 can be attached to the counter which it certifies: that is to say be recorded at the same address in the memory 14. In this case, the counter will have a complementary area 23 in which the certificate is stored.

The counters 10 and 13 can be produced in a known hardware form. In this case, it suffices to send pulses to them so that they count the points. In a preferred manner, however, the counters 10 and 13 will be memory areas of the memory 14 whose updating will be effected by means of the corresponding rules of the program 3.

With the invention, the routine sending of the points count to the central service in order to update the point accounts relating to the different holders can be dispensed with. This is because the count can be made directly in each of the cards. It is also no longer necessary to update the readers 9. This is because these must be capable only of giving their identity Ii to the cards. In the latter, categories of service providers or vendors can be recognised and, having previously stored the appropriate rules, the corresponding programs can be initiated.

Many service providers can benefit simply from this system. This is because, since the cards held by the individuals are changed regularly, it is very easy on this occasion to incorporate new rules matching new identities in their program 3. It is also equally possible, at the initiative of a special reader, to download new programs into them. In the same way, the rules for calculating the units can be varied. Finally, the rules can be modified according to the type of card, or even card by card since the rules are stored within them.

What is claimed is:

1. An integrated circuit card, comprising:

a microprocessor that executes at least one program;

a memory having stored therein a plurality of specific sets of rules for calculating bonus values;

a plurality of bonus counters respectively associated with said set of rules; and a test program in said memory that receives an identification of a reader with which said card is communicating and selects one of said specific sets of rules for calculation of a bonus value in accordance with a transaction conducted via said reader and storage of said value in the bonus counter associated with said selected set of rules.

2. The integrated circuit card of claim 1, wherein said memory further has stored therein a standard set of rules for calculating bonus values, and wherein said test program is responsive to said identification to determine whether a specific set of rules associated with the reader is stored in said memory, and if not to select said standard set of rules for calculation of the bonus value.

3. The integrated circuit card of claim 1 further including a register for storing the bonus value associated with a transaction being conducted via the reader.

4. The integrated circuit card of claim 1 further including a certification program in said memory that generates a certificate relating to the calculated bonus value.

5. The integrated circuit card of claim 4 wherein said microprocessor transmits the calculated bonus value and said certificate to the reader.

6. A method for counting bonus points in an integrated circuit card, comprising the steps of:

storing a plurality of sets of bonus calculation rules in the card;

receiving information regarding the identity of a reader with which the card is communicating to conduct a transaction;

determining whether one of the stored sets of rules is associated with the identified reader;

selecting the stored set of rules associated with the reader; and calculating bonus points in accordance with the selected set of rules.

7. The method of claim 6 further including the step of storing the calculated bonus points in one of a plurality of counters that are respectively associated with the sets of rules.

8. The method of claim 6 further including the steps of storing a standard set of bonus calculation rules, and selecting said standard set of rules when a determination is made that none of the stored sets of rules is associated with the identified reader.

9. The method of claim 6 further including the step of generating a certificate relating to the calculated bonus points.

10. The method of claim 9 further including the step of transmitting the calculated bonus points and the certificate to the reader.

11. An integrated circuit card, comprising:

a microprocessor that executes at least one program;

a memory having stored therein a plurality of specific sets of rules for calculating bonus values and a set of standard rules for calculating bonus values; and a test program in said memory that receives an identification of a reader with which said card is communicating, determines whether a specific set of rules associated with the reader is stored in said memory, selects one of said specific sets of rules for calculation of a bonus value in accordance with a transaction conducted via said reader if said one specific set of rules is associated with the reader, and selects said standard set of rules for calculation of the bonus value if none of the specific sets of rules is associated with the reader.

12. An integrated circuit card, comprising:

a microprocessor that executes at least one program;

a memory having stored therein a plurality of sets of rules for calculating bonus values;

a test program in said memory that receives an identification of a reader with which said card is communicating and selects one of said specific sets of rules for calculation of a bonus value in accordance with a transaction conducted via said reader; and a certification program in said memory that generates a certificate relating to the calculated bonus value.

13. The integrated circuit card of claim 12 wherein said microprocessor transmits the calculated bonus value and said certificate to the reader.

* * * * *